US012597129B2

(12) United States Patent
Chung et al.

(10) Patent No.: US 12,597,129 B2
(45) Date of Patent: Apr. 7, 2026

(54) METHOD FOR ANALYZING IMMUNOHISTOCHEMISTRY IMAGES

(71) Applicant: NATIONAL CHENG KUNG UNIVERSITY, Tainan City (TW)

(72) Inventors: Pau-Choo Chung, Tainan City (TW);
Hung-Wen Tsai, Tainan City (TW);
Shao-Kai Liao, New Taipei City (TW);
Kuo-Sheng Cheng, Tainan City (TW)

(73) Assignee: National Cheng Kung University,
Tainan City (TW)

( * ) Notice: Subject to any disclaimer, the term of this patent is extended or adjusted under 35 U.S.C. 154(b) by 384 days.

(21) Appl. No.: 18/155,081

(22) Filed: Jan. 17, 2023

(65) Prior Publication Data

US 2023/0237656 A1      Jul. 27, 2023

(30) Foreign Application Priority Data

Jan. 25, 2022    (TW) .................................. 111103186

(51) Int. Cl.
G06T 7/00          (2017.01)
G06T 5/92          (2024.01)
G06T 7/90          (2017.01)

(52) U.S. Cl.
CPC .............. G06T 7/0012 (2013.01); G06T 5/92 (2024.01); G06T 7/90 (2017.01); G06T 2207/20036 (2013.01); G06T 2207/30024 (2013.01)

(58) Field of Classification Search
CPC ........... G06T 7/0012; G06T 5/92; G06T 7/90; G06T 2207/20036; G06T 2207/30024;
(Continued)

(56) References Cited

U.S. PATENT DOCUMENTS 12,131,465 B2 * 10/2024 Luna ......................... G06T 7/11
2005/0163373 A1 * 7/2005 Lee ........................... G06T 7/11
382/173

(Continued)

FOREIGN PATENT DOCUMENTS

CN        108885681 A     11/2018
CN        110088804 A     8/2019
(Continued)

OTHER PUBLICATIONS

Lindblad, J., WÃ¤hlby, C., Bengtsson, E. and Zaltsman, A. (2004), Image analysis for automatic segmentation of cytoplasms and classification of Rac1 activation. Cytometry, 57A: 22-33. https://doi.org/10.1002/cyto.a.10107 (Year: 2004).*

(Continued)

*Primary Examiner* — Amandeep Saini
*Assistant Examiner* — Emma Rose Goebel
(74) *Attorney, Agent, or Firm* — CKC & Partners Co., LLC

(57)                    ABSTRACT
A method for analyzing an immunohistochemistry (IHC) image is provided and includes: segmenting nuclei from the IHC image according to a machine learning model; removing pixels belonging to the nuclei and pixels in a color range from the IHC image to obtain multiple cytoplasmic pixels;

(Continued)

assign the cytoplasmic pixels to the nuclei to form multiple cells according to the locations of the cytoplasmic pixels; and calculate a pixel staining score of each pixel in the cells, thereby calculating a cell staining score for each cell.

15 Claims, 5 Drawing Sheets

(1 of 5 Drawing Sheet(s) Filed in Color)

(58) Field of Classification Search
CPC .......... G06T 7/187; G06T 2207/10024; G06T 2207/20084; G06T 7/11; G06T 7/155; G06T 2207/20152; Y02A 90/10
See application file for complete search history.

(56) References Cited

U.S. PATENT DOCUMENTS

| | | | | |
|---|---|---|---|---|
| 2012/0081548 A1* | 4/2012 | Zhang | ................... | H04N 9/806 |
| | | | | 382/167 |
| 2015/0063690 A1* | 3/2015 | Chiu | ........................ | G06T 7/90 |
| | | | | 382/165 |

| | | | |
|---|---|---|---|
| 2018/0204085 A1 | 7/2018 | Chennubhotla et al. | |
| 2018/0336682 A1 | 11/2018 | Chukka et al. | |

FOREIGN PATENT DOCUMENTS

| | | |
|---|---|---|
| CN | 110288582 A | 9/2019 |
| EP | 3789960 A1 | 3/2021 |
| TW | 201510936 A | 3/2015 |
| WO | 2014/140085 A1 | 9/2014 |

OTHER PUBLICATIONS

Ram S, Vizcarra P, Whalen P, Deng S, Painter CL, Jackson-Fisher A, et al. (2021) Pixelwise H-score: A novel digital image analysis-based metric to quantify membrane biomarker expression from immunohistochemistry images. PLoS One 16(9): e0245638. https://doi.org/10.1371/journal.pone.0245638 (Year: 2021).*

Simon Graham et al., "Hover-Net: Simultaneous segmentation and classification of nuclei in multi-tissue histology images," Medical Image Analysis, vol. 58, Sep. 2019, pp. 1-18.

Parmida Ghahremani et al., "Deep Learning-Inferred Multiplex ImmunoFluorescence for IHC Image Quantification," bioRxiv, Oct. 8, 2021, pp. 1-24.

* cited by examiner

METHOD FOR ANALYZING IMMUNOHISTOCHEMISTRY IMAGES

RELATED APPLICATIONS

This application claims priority to Taiwan Application Serial Number 111103186 filed Jan. 25, 2022, which is herein incorporated by reference.

BACKGROUND

Field of Invention

The present disclosure relates to a method for analyzing immunohistochemistry images. The degree each cell is stained is assessed objectively by an algorithm.

Description of Related Art

Immunohistochemistry (IHC) is a widely used method to mark specific organic substances. The principle is to use a specific combination of antigens and antibodies to make the target antigenic substances appear in the whole slide image (WSI). Immunohistochemistry staining is often used in medical research to calculate the pathological parameters of the marked cells and observe correlation of the phenotypic parameters with cancer tumors. However, conventional analysis methods rely on subjective judgment of doctors. How a score is calculated objectively is a topic of concern to those skilled in the field.

SUMMARY

Embodiments of the present disclosure provide a method performed by a computer system for analyzing an immuno-histochemistry image. The method includes: segmenting multiple cell nuclei from the immunohistochemistry image according to a machine learning model, in which the immuno-histochemistry image includes multiple pixels, and each of the pixels includes multiple color channels; removing the pixels belonging to the cell nuclei and the pixels in at least one color range from the immunohistochemistry image to obtain multiple cytoplasmic pixels; assigning each of the cytoplasmic pixels to one of the cell nuclei according to a location of the corresponding cytoplasmic pixel to form multiple cells; and calculating a pixel staining score of each of the pixels in each of the cells to calculate a cell staining score of each of the cells.

In some embodiments, removing the pixels in the at least one color range includes: transforming each of the pixels into a color space including a phase, saturation and brightness; and reserving the pixels having the phase in a first preset range and the saturation in a second preset range, and removing the pixels having the brightness greater than a first threshold.

In some embodiments, the step of assigning each of the cytoplasmic pixels to one of the cell nuclei includes: taking the cell nuclei as multiple regional minimums and taking the cytoplasmic pixels as a catchment basin so as to perform a watershed algorithm to generate multiple segmentation boundaries; and assigning the cytoplasmic pixels to the cell nucleus within a same one of the segmentation boundaries.

In some embodiments, after forming the cells, the method further includes: calculating a pixel amount of each of the cells; and if the pixel amount of a first cell of the cells is greater than a second threshold and less than a third threshold, deleting the cytoplasmic pixels of the first cell. A result of a morphological dilation based on the cell nucleus of the cells is added to a result of the watershed algorithm.

In some embodiments, the step of calculating the pixel staining score of each of the pixels in each of the cells to calculate the cell staining score of each of the cells includes: calculating the pixel staining score according to a ratio of the saturation to the brightness of the corresponding pixel; and calculating a weighting sum of the pixel staining scores of the pixels of each of the cells as the cell staining score in which a weight is assigned based on a pixel amount.

From another aspect, embodiments of the present disclosure provide an electrical device including a processor and a memory. The memory stores instructions which are executed by the processor to perform the aforementioned method.

From another aspect, embodiments of the present disclosure provide a non-transitory computer readable storage media storing instructions which are configured to be executed by a computer system to perform the aforementioned method.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

The immunohistochemistry (IHC) image described herein is related to a slice of liver cells in which Hepatitis B surface antigen (HBsAg) is stained. HBsAg is the first viral antigen to appear in serum after hepatitis B virus infection, and it is also the most important indicator of hepatitis B. The color of the cells with hepatitis B surface antigen is stained into red in the IHC image. A method is proposed to analyze such IHC image.

Figure 1:
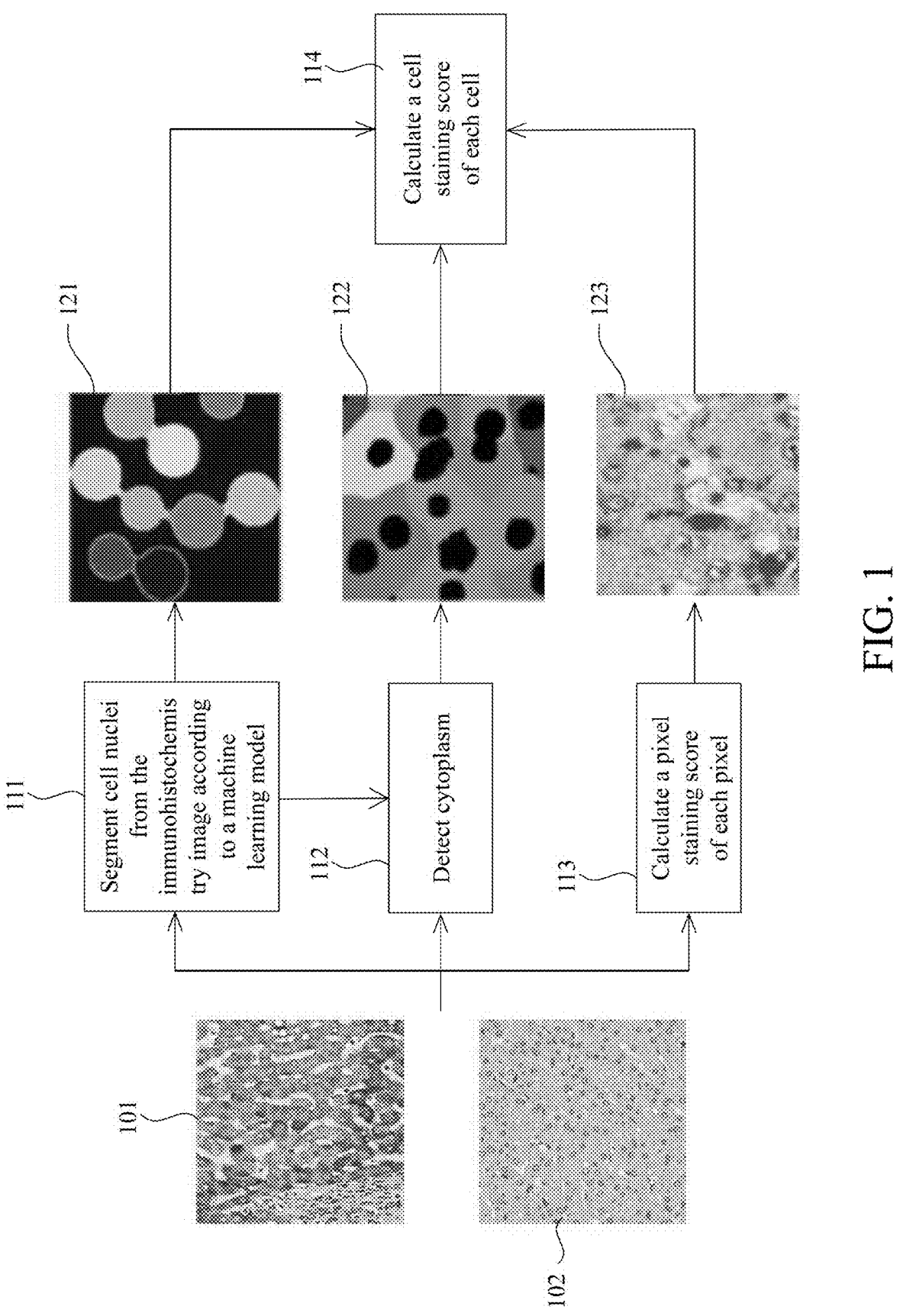
FIG. 1 is a method for analyzing an immunohistochemistry image in accordance with an embodiment.

FIG. 1 is a method for analyzing an immunohistochemistry image in accordance with an embodiment. Two immunohistochemistry images 101 and 102 are shown as examples in FIG. 1. The immunohistochemistry images 101 and 102 are color images and each of which includes multiple pixels. Each pixel includes color channels of red, blue, and green. The immunohistochemistry image 101 contains more HBsAg and therefore is more red compared with the immunohistochemistry image 102. Each of the immunohistochemistry images 101 and 102 will be independently processed in the steps 111-114.

In step 111, multiple cell nuclei are segmented from the immunohistochemistry image according to a machine learning model such as a convolutional neural network (CNN). The structure of the CNN may be based on LeNet, AlexNet, VGG, GoogLeNet, ResNet or VOLO. In the embodiment, the CNN model is based on the paper of Graham, Simon, et al. "Hover-net: Simultaneous segmentation and classification of nuclei in multi-tissue histology images." *Medical Image Analysis* 58 (2019): 101563 which is incorporated by reference. The loss functions are modified as the following Equations 1 to 5 that are different from the Hover-net.

$$L = L_{NP} + L_{Hover} \qquad \text{[Equation 1]}$$

$$L_{NP} = L_{bce} + L_{dice} + L_{focal} \qquad \text{[Equation 2]}$$

$$L_{bce} = -\frac{1}{N}\sum\nolimits_{i=1}^{N}[x_i\log(y_i) + (1 - x_i)\log(1 - y_i)] \qquad \text{[Equation 3]}$$

$$L_{dice} = 1 - \frac{2\times\sum_{i=1}^{N}(y_i\times x_i) + \varepsilon}{\sum_{i=1}^{N}y_i + \sum_{i=1}^{N}x_i + \varepsilon} \qquad \text{[Equation 4]}$$

$$L_{focal} = -(1 - p_t)^\gamma\log(p_t),\ p_t = \begin{cases} p, & \text{if } y = 1 \\ 1 - p, & \text{if } y = 0 \end{cases} \qquad \text{[Equation 5]}$$

The network includes two branches which are nuclear pixel (NP) branch and HoVer branch. L denotes the loss function of the whole network. $L_{NP}$ denotes the loss function of the NP branch. $L_{Hover}$ denotes the loss function of the HoVer branch. $L_{NP}$ denotes the summation of binary cross entropy, dice loss, and focal loss. N denotes the number of all pixels in the image. $x_i$ denotes the ground truth. $y_i$ denotes the predicted value. For example, y=1 indicates the cell nucleus, and y=0 indicates the background. $\varepsilon$ denotes a small number for avoiding dividing by zero. p denotes the estimated probability for the class with label of cell nucleus. $\gamma$ denotes a real number set as 0.5 in the embodiment.

On the other hand, the loss function $L_{Hover}$ is written as the following Equations 6-8.

$$L_{Hover} = L_{mse} + L_{msge} \qquad \text{[Equation 6]}$$

$$L_{mse} = \frac{1}{n}\sum\nolimits_{i=1}^{n}(p_i - \Gamma_i) \qquad \text{[Equation 7]}$$

$$L_{msge} = \frac{1}{m}\sum\nolimits_{i\in m}(\nabla_x(p_{i,x}) - \nabla_x(\Gamma_{i,x}))^2 + \qquad \text{[Equation 8]}$$
$$\frac{1}{m}\sum\nolimits_{i\in m}(\nabla_y(p_{i,y}) - \nabla_y(\Gamma_{i,y}))^2$$

n denotes the number of all pixels in the image. $p_1$ denotes the output of the HoVer branch. $\Gamma_i$ denotes the ground truth. For the mean squared gradient error, the output horizontal and vertical components are denoted as $p_{i,x}$ and $p_{i,y}$, respectively and for the ground horizontal ground truth $\Gamma_{i,x}$ and vertical ground truth $\Gamma_{i,y}$. $\nabla_x$ denotes the gradient in the horizontal direction, and $\nabla_y$ denotes the gradient in the vertical direction. m denotes the total number of pixels classified as cell nuclei and the set containing all pixels classified as cell nuclei. An image 121 is obtained after the step 111 is performed. Each pixel of the image 121 represents if it belongs to a cell nucleus. For example, "1" indicates the cell nucleus, and "0" is the background.

After the cell nuclei are segmented, a step 112 is performed to detect cytoplasm. The boundary of a cell is generally blurred, and thus it is difficult to detect the cytoplasm even using CNN. Four image processing approaches are provided herein which are based on dilation, region-growing, texture thresholding, and contrast.

The approach of morphological dilation is described herein first. Referring to the following Equations 9 and 10.

$$D=U_{b\in B}A_b \qquad \text{[Equation 9]}$$

$$Y=D\cap A' \qquad \text{[Equation 10]}$$

Figure 2:
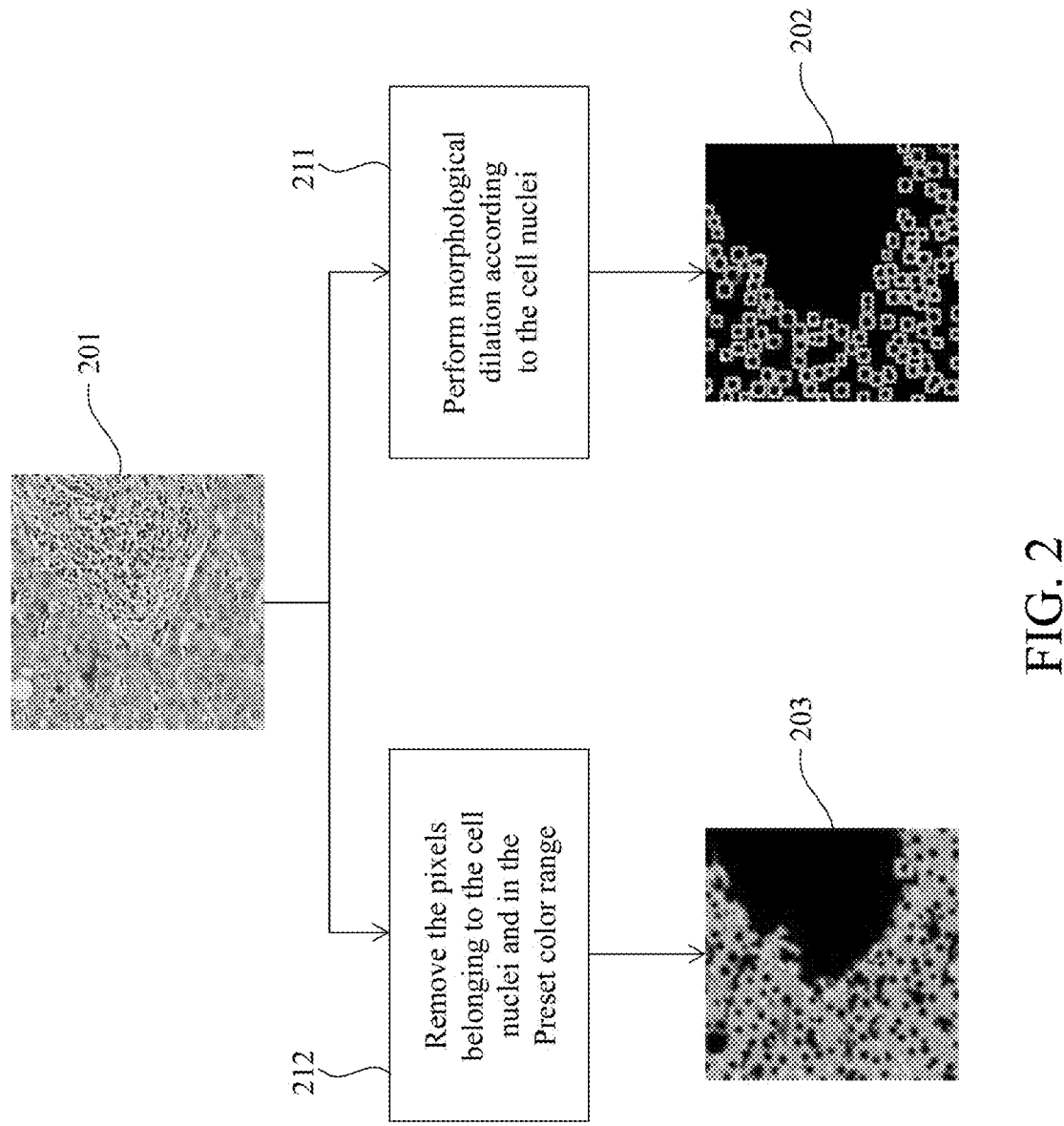
FIG. 2 is a schematic diagram of obtaining cytoplasmic pixels in accordance with an embodiment.

A is a binary image (e.g. the image 121) in which "1" indicates the cell nucleus and "0" indicates the background. A' is the inverse of the binary image A. B denotes a mask with a size of 31×31 pixels consisting of 1. $A_b$ is the and operation of A and b (element in B). $\cap$ is the and operation. After the Equation 10 is performed, the cell nuclei are removed. Y denotes the result image as shown in FIG. 2. After the cell nuclei are segmented from an immunohistochemistry image 201, the morphological dilation is performed according to the cell nuclei in a step 211 to obtain an image 202 showing the cytoplasm. The pixels of the cytoplasm in the image 202 are also referred to as cytoplasmic pixels. It is shown in the image 202 that the extracted cytoplasm is extended outward in a certain distance from the corresponding cell nuclei. If a cell is large, then some cytoplasm may be missed; and if a cell is small, then wrong cytoplasm may be captured.

The second image processing approach is based on region-growing. The cell nuclei serve as seeds. It is determined if the pixels surrounding the seeds are similar to the seeds, and if yes, the pixels are included as cytoplasmic pixels. This step is repeated until all pixels in a certain range are processed. In some embodiments, the result of the morphological dilation is taken as the certain range. The region-growing based approach may be written as the following Equation 11.

$$Color_{similar}=|G(Seed_i)-G(neighbor_i)|<\varepsilon \qquad \text{[Equation 11]}$$

$Seed_i$ denotes the $i^{th}$ seed. $G(Seed_i)$ denotes the grey level of the $i^{th}$ seed. For example, $G(Seed_i)$ is the "value" component after the pixel is transformed into the HSV color space. $neighbor_i$ denotes the neighbors of the $i^{th}$ seed. In some embodiments, 8 surrounding pixels are defined as the neighbors. $\varepsilon$ denotes a threshold such as 7 in some embodiments. The brightness of the pixels in the cytoplasm has to be similar to each other in the region-growing based approach, and the cytoplasm may not be captured accurately if the brightness difference is large.

The third image processing approach is based on texture thresholding. In the embodiment, Gabor kernels are used to extract features, and then principle component analyze (PCA) is performed to reduce the dimensions of the features. Each pixel is reduced to only one dimension, and then a threshold is used to determine if a pixel belongs to the cytoplasmic pixel or the background.

The fourth image processing approach is based on contrast. In the immunohistochemistry image, some colors are obviously not cytoplasm. For example, a white region may be an oil drop, a blue region may be a cell nucleus, and a black region may be a portal cell. Therefore, the pixels in at least one preset color range are removed from the immunohistochemistry image while the remaining pixels are the cytoplasmic pixels. To be specific, the pixels are transformed into a color space consisting of brightness, phase, and saturation. Any suitable color space may be used. In the HSV color space, the brightness is referred to as "value", and the phase is referred to as "hue". In some color spaces, the brightness may be referred to as "intensity" or "luminance". The HSV color space is adopted in this embodiment, but the terminologies of brightness, phase, and saturation are used for general description. The pixels having the phase in the range of 100-125 (also referred to as a first preset range), the saturation in the range of 80-255 (also referred to as a second preset range), and the brightness in the range of 0-110 are reserved, and all remaining pixels are removed. That is, the pixels having the brightness greater than 110 are removed. The cell nuclei detected in the step 111 are also removed. The result is shown in FIG. 2. The pixels belonging to the cell nuclei and in the preset color range are removed from the immunohistochemistry image 201 in the step 212 to generate an image 203. In some embodiments, small fragments may also be removed by a morphological erosion in the step 212.

Figure 3:
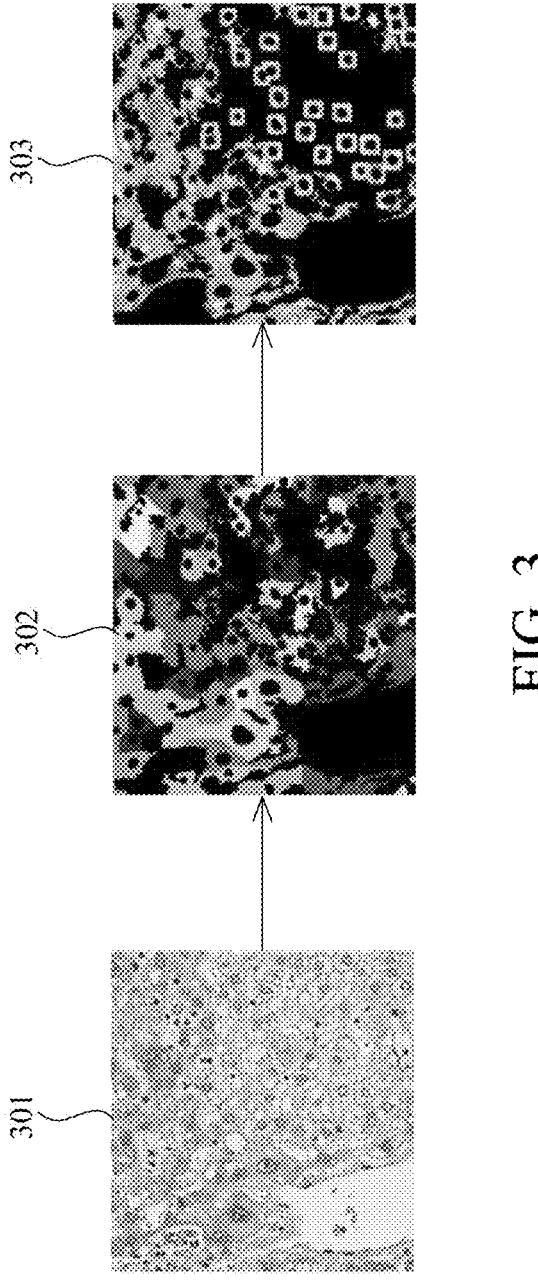
FIG. 3 is a schematic diagram of performing a watershed algorithm in accordance with an embodiment.

Anyone of the four image processing approaches may be adopted. After that, the cytoplasmic pixels will be assigned to the corresponding cell nucleus according to the location of the cytoplasmic pixel to form multiple cells. In some embodiments, the cytoplasmic pixels are assigned based on a concept of regional competition. In other words, the cell nuclei compete with each other for the cytoplasmic pixels. For example, a watershed algorithm may be adopted. The cell nuclei are taken as regional minimums, and the cytoplasmic pixels are taken as a catchment basin. In brief, different labels of water are injected into different regional minimums, and then the water level raises in the corresponding catchment basin until different labels of water touches each other to generate multiple segmentation boundaries. The cytoplasmic pixels are assigned to the cell nucleus within the same segmentation boundary (i.e. in the same label of water). People in the art should be able to appreciate the watershed algorithm, and thus the detail will not be described herein. In some embodiments, gradients of the catchment basins are set to be the same. Each time the water level raises, the catchment basin expands outwards for one pixel. The result of the watershed algorithm is shown in FIG. 3. Cell nuclei are segmented from the immunohistochemistry image 301, and then cytoplasm is detected. An image 302 is generated after the watershed algorithm is performed in which black holes represents the locations of the cell nuclei. In the image 302, the cytoplasmic pixels are rendered in different grey levels to represent different cells. In some embodiments, the number of pixels (also referred to a pixel amount) in each cell is calculated. If the pixel amount is greater than a second threshold (e.g. 30000) and less than a third threshold (e.g. 1500), then this cell could be a portal or another tissue which is falsely detected. Therefore, if the pixel amount meets the mentioned threshold, the cytoplasmic pixels in the corresponding cell are deleted. In some embodiments, the result of the morphological dilation based on the cell nuclei is added into the image 302 (i.e. the result of the watershed algorithm) to generate an image 303. Note that some cells in the image 303 may include only limited amount of cytoplasm. The goal is to analyze the color of each cell, but should not be obsessed to obtain all cytoplasm in each cell. A portion of the cytoplasm is already included in the result of the morphological dilation, and this amount of the cytoplasm is enough for analyze. Referring to FIG. 1, an image 122 is obtained to represent the cytoplasm after the step 112 is performed.

In some embodiments, the concept of regional competition is implemented by calculating the distance between each cytoplasmic pixel and each cell nucleus. Each cytoplasmic pixel is assigned to the closest cell nucleus.

Figure 4:
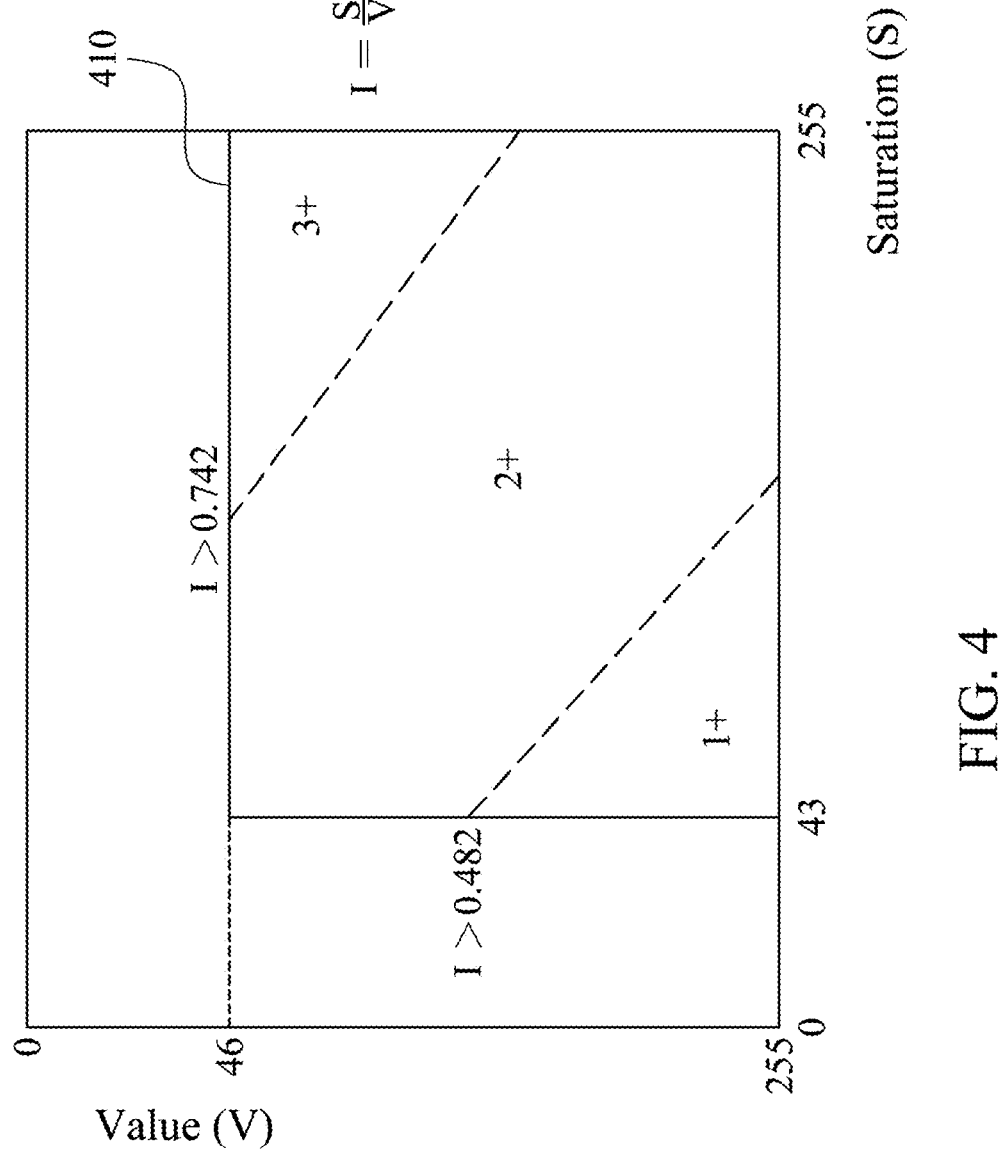
FIG. 4 is a schematic diagram of calculating pixel staining score based on HSV color space in accordance with an embodiment.

In step 113, a pixel staining score of each pixel of each cell is calculated. The HSV color space is adopted herein. Red pixels are selected first. The pixels having the phase (i.e. hue) in the range of 0-10 and 156-180, the saturation (S) in the range of 43-255, and the brightness (i.e. value) in the range of 46-255 are taken as red pixels. The pixel staining scores of all other non-red pixels are set to be 0. FIG. 4 is a schematic diagram of calculating the pixel staining score based on HSV color space in accordance with an embodiment. Referring to FIG. 4, the horizontal axis is the saturation (S), and the vertical axis is the value (V). The saturation has been restricted to the range of 43-255, and the value has been restricted to the range of 46-255, and therefore only the pixels in a range 410 are considered. The pixel staining score is calculated according to a ratio (noted as "I") of the saturation (S) to the value (V) (i.e. brightness). When the ratio (I) is greater than 0.742, the pixel staining score is set to be "3+"; when the ratio (I) is in the range of 0.482-0.742, the pixel staining score is "2+"; and when the ratio (I) is less than or equal to 0.482, the pixel staining score is "1+". The thresholds of "0.742" and "0.482" are merely examples and can be other values in other embodiments. In addition, the color space of LAB, etc. may be adopted in other embodiments. Four levels of "0", "1+", "2+", and "3+" are set for the pixel staining score in the embodiment, but more or less levels may be set in other embodiments. Referring to FIG. 1, after the step 113 is performed, an image 123 is obtained in which red color represents high pixel staining scores and yellow color represents low pixel staining scores.

After the pixel staining score of each pixel is calculated, a step 114 is performed to calculate a cell staining score of each cell. The cell nuclei are obtained from the image 121, the cytoplasm is obtained from the image 122, and the pixels of one cell are obtained after assign the cytoplasm to the corresponding cell nucleus. In the embodiment, a weighting sum of the pixel staining scores is calculated as the cell staining score while a weight is assigned based on a pixel amount. In detail, the calculation of the cell staining score is written in the following Equation 12.

$$\text{Stain}_{score} = \frac{1}{3} \times (100 \times \alpha + 200 \times \beta + 300 \times \gamma) \qquad \text{[Equation 12]}$$

$\alpha$ denotes the ratio of the pixels having the pixel staining score "1+" in the corresponding cell. $\beta$ denotes the ratio of the pixels having the pixel staining score "2+" in the corresponding cell. $\gamma$ denotes the ratio of the pixels having the pixel staining score "3+" in the corresponding cell. For example, if a cell has 1.7% of "3+" pixels, 7.2% of "2+" pixels, and 26.1% of "1+" pixels, then the cell staining score is equal to 15.2 according to the Equation 12. The numbers of "100", "200", and "300" in the Equation 12 are merely examples and can be other values in other embodiments.

In the aforementioned method, the cells are segmented and the scores thereof are calculated objectively to represent the degree of redness. Accordingly, it can save manpower and assist doctors in interpretation. Different from using convolutional neural network to identify cytoplasm, the present disclosure proposes several image processing approaches to identify the cytoplasm. Therefore, the problem of cytoplasm identification is addressed. In particular a deletion method is used to obtain the cytoplasm, which can solve the problem of blurred cell boundaries. Compared with actively detecting cytoplasm, the deletion method has better results. Finally, the ratio between the saturation and the brightness is used to calculate the pixel staining score, and thus objective results are achieved.

Figure 5:
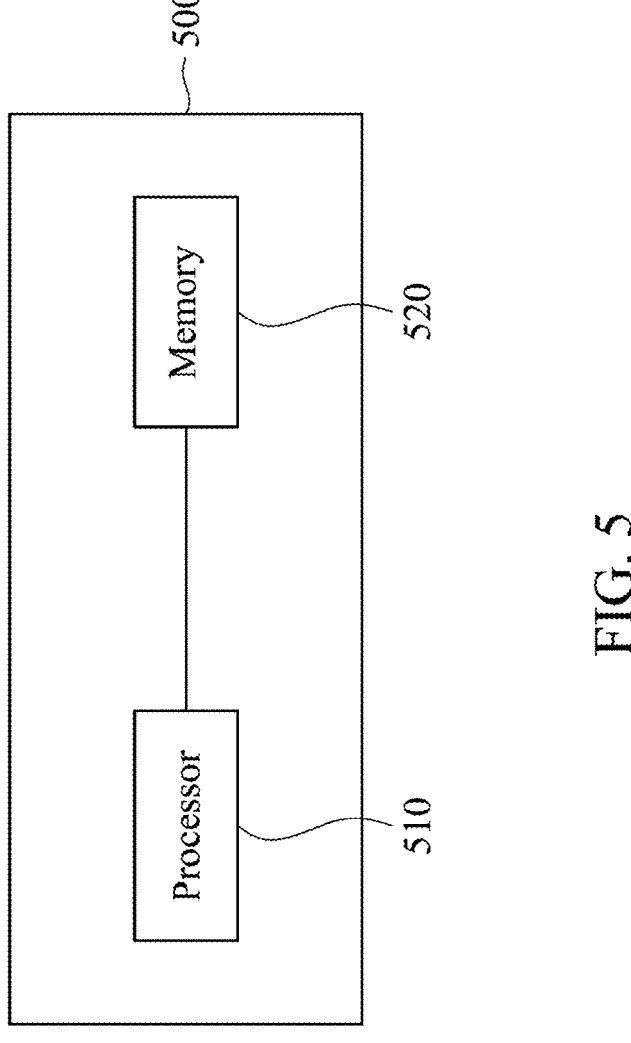
FIG. 5 is a diagram of an electrical device in accordance with an embodiment.

FIG. 5 is a diagram of an electrical device in accordance with an embodiment. Referring to FIG. 5, an electrical device 500 is provided to perform the method of FIG. 2. The electrical device 500 includes a processor 510 and a memory 520. The processor 510 may be a central processing unit, a graphical processing unit, a microprocessor, a microcontroller, an image processing chip, an application-specific integrated circuit, etc. The memory 520 may be a random access memory, a read-only memory, a flash memory, floppy disks, hard disks, CD-ROMs, pen drives, tapes, databases accessible via the Internet. The memory 520 stores instructions that are executed by the processor 510 to perform the method of FIG. 2. From another aspect, a non-transitory computer readable storage media is provided. For example, the media may be a random access memory, a read-only memory, a flash memory, floppy disks, hard disks, CD-ROMs, pen drives, tapes, databases accessible via the Internet for storing instructions which are configured to be executed by a computer system to perform the method of FIG. 2.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method performed by a computer system for analyzing an immunohistochemistry image, the method comprising:
 segmenting a plurality of cell nuclei from the immunohistochemistry image according to a machine learning wherein the model, immunohistochemistry image comprises a plurality of pixels, and each of the pixels comprises a plurality of color channels;
 removing the pixels belonging to the cell nuclei while outlines of the cell nuclei are retained, transforming each of the pixels of the immunohistochemistry image into a color space comprising a phase, saturation and brightness, and removing the pixels from the immuno-histochemistry image in at least one color range to obtain a plurality of cytoplasmic pixels accordingly, wherein the cytoplasmic pixels are free of the pixels belonging to the cell nuclei and free of the pixels of the immunohistochemistry image in the at least one color range;
 assigning each of the cytoplasmic pixels to one of the cell nuclei according to a location of the corresponding cytoplasmic pixel to form a plurality of cells; and
 calculating a pixel staining score of each of the pixels in each of the cells to calculate a cell staining score of each of the cells.

2. The method of claim 1, wherein removing the pixels in the at least one color range comprises:
 reserving the pixels having the phase in a first preset range and the saturation in a second preset range, and removing the pixels having the brightness greater than a first threshold.

3. The method of claim 2, wherein the step of assigning each of the cytoplasmic pixels to one of the cell nuclei comprises:
 taking the cell nuclei as a plurality of regional minimums and taking the cytoplasmic pixels as a catchment basin so as to perform a watershed algorithm to generate a plurality of segmentation boundaries; and
 assigning the cytoplasmic pixels to each of the cell nuclei within a same one of the segmentation boundaries.

4. The method of claim 3, wherein after forming the cells, the method further comprises:
 calculating a pixel amount of each of the cells;
 if the pixel amount of a first cell of the cells is greater than a second threshold and less than a third threshold, deleting the cytoplasmic pixels of the first cell; and
 adding a result of a morphological dilation based on the cell nuclei of the cells to a result of the watershed algorithm.

5. The method of claim 4, wherein the step of calculating the pixel staining score of each of the pixels in each of the cells to calculate the cell staining score of each of the cells comprises:
 calculating the pixel staining score according to a ratio of the saturation to the brightness of the corresponding pixel; and
 calculating a weighting sum of the pixel staining scores of the pixels of each of the cells as the cell staining score wherein a weight is assigned based on a pixel amount.

6. An electrical device comprising:
 a memory configured to store a plurality of instructions; and
 a processor configured to execute the instructions to perform a plurality of steps:
 segmenting a plurality of cell nuclei from a immunohis-tochemistry image according to a machine learning model, wherein the immunohistochemistry image comprises a plurality of pixels, and each of the pixels comprises a plurality of color channels;
 removing the pixels belonging to the cell nuclei while outlines of the cell nuclei are retained, transforming each of the pixels of the immunohistochemistry image into a color space comprising a phase, saturation and brightness, and removing the pixels from the immuno-histochemistry image in at least one color range to obtain a plurality of cytoplasmic pixels accordingly, wherein the cytoplasmic pixels are free of the pixels belonging to the cell nuclei and free of the pixels of the immunohistochemistry image in the at least one color range;
 assigning each of the cytoplasmic pixels to one of the cell nuclei according to a location of the corresponding cytoplasmic pixel to form a plurality of cells; and
 calculating a pixel staining score of each of the pixels in each of the cells to calculate a cell staining score of each of the cells.

7. The electrical device of claim 6, wherein removing the pixels in the at least one color range comprises:
 reserving the pixels having the phase in a first preset range and the saturation in a second preset range, and removing the pixels having the brightness greater than a first threshold.

8. The electrical device of claim 7, wherein the step of assigning each of the cytoplasmic pixels to one of the cell nuclei comprises:

taking the cell nuclei as a plurality of regional minimums and taking the cytoplasmic pixels as a catchment basin so as to perform a watershed algorithm to generate a plurality of segmentation boundaries; and assigning the cytoplasmic pixels to each of the cell nuclei within a same one of the segmentation boundaries.

9. The electrical device of claim 8, wherein after forming the cells, the steps further comprise:

calculating a pixel amount of each of the cells;

if the pixel amount of a first cell of the cells is greater than a second threshold and less than a third threshold, deleting the cytoplasmic pixels of the first cell; and adding a result of a morphological dilation based on the cell nuclei of the cells to a result of the watershed algorithm.

10. The electrical device of claim 9, wherein the step of calculating the pixel staining score of each of the pixels in each of the cells to calculate the cell staining score of each of the cells comprises:

calculating the pixel staining score according to a ratio of the saturation to the brightness of the corresponding pixel; and calculating a weighting sum of the pixel staining scores of the pixels of each of the cells as the cell staining score wherein a weight is assigned based on a pixel amount.

11. A non-transitory computer readable storage media storing a plurality of instructions which are configured to be executed by a computer system to perform a plurality of steps:

segmenting a plurality of cell nuclei from a immunohistochemistry image according to a machine learning model, wherein the immunohistochemistry image comprises a plurality of pixels, and each of the pixels comprises a plurality of color channel;

removing the pixels belonging to the cell nuclei while outline of the cell nuclei are retained, transforming each of the pixels of the immunohistochemistry image into a color space comprising a phase, saturation and brightness, and removing the pixels from the immunohistochemistry image in at least one color range to obtain a plurality of cytoplasmic pixels accordingly, wherein the cytoplasmic pixels are free of the pixels belonging to the cell nuclei and free of the pixels of the immunohistochemistry image in the at least one color range;

assigning each of the cytoplasmic pixels to one of the cell nuclei according to a location of the corresponding cytoplasmic pixel to form a plurality of cells; and calculating a pixel staining score of each of the pixels in each of the cells to calculate a cell staining score of each of the cells.

12. The non-transitory computer readable storage media of claim 11, wherein removing the pixels in the at least one color range comprises:

reserving the pixels having the phase in a first preset range and the saturation in a second preset range, and removing the pixels having the brightness greater than a first threshold.

13. The non-transitory computer readable storage media of claim 12, wherein the step of assigning each of the cytoplasmic pixels to one of the cell nuclei comprises:

taking the cell nuclei as a plurality of regional minimums and taking the cytoplasmic pixels as a catchment basin so as to perform a watershed algorithm to generate a plurality of segmentation boundaries; and assigning the cytoplasmic pixels to each of the cell nuclei within a same one of the segmentation boundaries.

14. The non-transitory computer readable storage media of claim 13, wherein after forming the cells, the steps further comprise:

calculating a pixel amount of each of the cells;

if the pixel amount of a first cell of the cells is greater than a second threshold and less than a third threshold, deleting the cytoplasmic pixels of the first cell; and adding a result of a morphological dilation based on the cell nuclei of the cells to a result of the watershed algorithm.

15. The non-transitory computer readable storage media of claim 14, wherein the step of calculating the pixel staining score of each of the pixels in each of the cells to calculate the cell staining score of each of the cells comprises:

calculating the pixel staining score according to a ratio of the saturation to the brightness of the corresponding pixel; and calculating a weighting sum of the pixel staining scores of the pixels of each of the cells as the cell staining score wherein a weight is assigned based on a pixel amount.

\* \* \* \* \*